(12) United States Patent
Cho et al.

(10) Patent No.: US 12,327,272 B2
(45) Date of Patent: Jun. 10, 2025

(54) LIVE-COMMERCE SYSTEM FOR DETERMINING WINNERS THROUGH GAMES AND METHOD THEREOF

(71) Applicant: GripCompany Co., Ltd., Seoul (KR)

(72) Inventors: Hang Doo Cho, Seongnam-si (KR); Hyeon Jeong Ahn, Seongnam-si (KR); Eun Ji Han, Incheon (KR)

(73) Assignee: GripCompany Co., Ltd., Seoul (KR)

( * ) Notice: Subject to any disclaimer, the term of this patent is extended or adjusted under 35 U.S.C. 154(b) by 387 days.

(21) Appl. No.: 17/646,353

(22) Filed: Dec. 29, 2021

(65) Prior Publication Data

US 2023/0206296 A1    Jun. 29, 2023

(51) Int. Cl.
G06Q 30/0601    (2023.01)

(52) U.S. Cl.
CPC ..... G06Q 30/0613 (2013.01); G06Q 30/0641 (2013.01)

(58) Field of Classification Search
CPC ............. G06Q 30/0601–0643; G06Q 30/08
See application file for complete search history.

(56) References Cited

U.S. PATENT DOCUMENTS

| | | | | |
|---|---|---|---|---|
| 10,219,015 | B2 * | 2/2019 | Kokenos | H04N 21/812 |
| 11,356,742 | B2 * | 6/2022 | Azuolas | H04N 21/4788 |
| 11,362,846 | B1 * | 6/2022 | Head | G06Q 30/08 |
| 2005/0287971 | A1 * | 12/2005 | Christensen | H04N 21/26258 |
| | | | | 348/E7.071 |
| 2014/0032363 | A1 * | 1/2014 | Zhao | G06Q 30/0643 |
| | | | | 705/26.25 |
| 2017/0148090 | A1 * | 5/2017 | Davi | G06Q 30/06 |
| 2018/0150889 | A1 * | 5/2018 | Hilliard | G06F 16/735 |
| 2021/0233364 | A1 * | 7/2021 | Jarvis | G07F 17/3293 |

(Continued)

FOREIGN PATENT DOCUMENTS

| | | | | |
|---|---|---|---|---|
| GB | 2486744 | A * | 6/2012 | ......... H04N 21/2358 |
| JP | 2004-310391 | A | 11/2004 | |
| JP | 2005-516287 | A | 6/2005 | |

(Continued)

OTHER PUBLICATIONS

Guo, D., et. al. "A New Auction Based Approach to Efficient P2P Live Streaming," 2011 IEEE 17th International Conference on Parallel and Distributed Systems, Tainan, Taiwan, pp. 573-580, doi: 10.1109/ICPADS.2011.9. (Year: 2011).*

(Continued)

*Primary Examiner* — Kelly S. Campen
*Assistant Examiner* — Katherine A Barlow
(74) *Attorney, Agent, or Firm* — Sughrue Mion, PLLC (57) ABSTRACT

A live-commerce system according to an embodiment of the present disclosure includes a seller terminal equipped with a live-commerce application, a user terminal equipped with the live-commerce application, and a live-commerce server configured to utilize a chat function between the seller terminal and the user terminal to progress a game selected as a method of selling a product by the seller. In this case, the live-commerce server delivers a chat message including game information related to the selected game to the user terminal based on a time of the live-commerce server to control chatting and the game information to be displayed on the user terminal without a time difference through the chat function.

8 Claims, 7 Drawing Sheets

(56) References Cited

U.S. PATENT DOCUMENTS

2022/0051313 A1* 2/2022 Aumann ............ G06Q 30/0643

FOREIGN PATENT DOCUMENTS

| | | |
|---|---|---|
| JP | 2020-9335 A | 1/2020 |
| KR | 10-2007-0034846 A | 3/2007 |
| KR | 10-2013-0038642 A | 4/2013 |
| KR | 10-2013-0040438 A | 4/2013 |
| KR | 10-1895001 B1 | 9/2018 |
| KR | 10-2020-0005269 A | 1/2020 |
| WO | 2016/158075 A1 | 10/2016 |
| WO | WO-2017205934 A1 * 12/2017 | ............. A63F 13/34 |
| WO | 2021/106034 A1 | 6/2021 |

OTHER PUBLICATIONS

Wikipedia Contributors. "Real-time computing" Wikipedia, The Free Encyclopedia. Date of last revision: Feb. 4, 2024 04:10 UTC. Date retrieved: Mar. 4, 2024 21:31 UTC. https://en.wikipedia.org/w/index.php?title=Real-time_computing&oldid=1203071611 (Year: 2024).*

Bag, S., et. al., "SEAL: Sealed-Bid Auction Without Auctioneers," in IEEE Transactions on Information Forensics and Security, vol. 15, pp. 2042-2052, doi: 10.1109/TIFS.2019.2955793. (Year: 2020).*

Notice of Reasons for Refusal of Japanese Patent Application No. 2021-207584 issued on May 23, 2023 from Japanese Patent Office.

* cited by examiner

LIVE-COMMERCE SYSTEM FOR DETERMINING WINNERS THROUGH GAMES AND METHOD THEREOF

BACKGROUND

1. Field of the Invention

The present disclosure relates to a live-commerce system and method. More particularly, the present disclosure relates to a live-commerce system for progressing a game and determining winners by using a chat function, and a method thereof.

2. Discussion of Related Art

With the recent development of the e-commerce market, un-tact (non-face-to-face) consumption has become a daily routine. Live-commerce is a compound word of live streaming and e-commerce and is a method of broadcasting, introducing, and selling items in offline stores in real time on mobile. Viewers may communicate instantly by watching the broadcast and leaving comments.

The live-commerce is an online channel that sells items through real-time video streaming and is being actively used with the rise of an un-tact economy that pursues non-face-to-face and non-contact. Unlike TV home shopping, the live-commerce can realize two-way communication with viewers through a chat window, and viewers may easily make inquiries about items using the chat window.

The existing live-commerce only provides chatting and item purchase information along with a video where sellers promote items. This is merely a move from the conventional home shopping to a mobile environment, resulting in a problem in that various functions of mobile may not be actively utilized. Therefore, there is a limit in increasing an inflow rate of new viewers, and there is a limit in increasing a purchase conversion rate by converting existing viewers into consumers.

Therefore, there is a need to introduce factors that may increase the number of viewers introduced into a live-commerce broadcast, increase viewers' interest in products and/or items, and ultimately, stimulate the interest of viewers so as to convert viewers into consumers and increase a purchase conversion rate.

SUMMARY OF THE INVENTION

The present disclosure is directed to providing a live-commerce system and method for increasing a user's purchase rate by increasing users' concentration on a live-commerce broadcast and stimulating users' interest in the live-commerce broadcast through a game using a chat function of the live-commerce.

In addition, the present disclosure is directed to providing a live-commerce system and method for displaying chatting and game information on a user terminal without a time difference by including game information in a chat message and delivering the game information to the user terminal.

In addition, the present disclosure is directed to providing a live-commerce system and method for allowing users to check past game logs through a chat window and monitoring a process of selecting winners by linking chatting and games.

In addition, the present disclosure is directed to providing a live-commerce system and method for allowing sellers to select a method of selling products that fit purposes and users to accept a selection of winners for the limited number of products by enabling a method of selling items to be determined differently as one of an auction, a lottery, first-come-first-served basis, and dice according to the number of users, a type of products to be sold, the number of products to be sold, and a method of providing products.

In addition, the present disclosure is directed to providing a live-commerce system and method for selecting winners based on a time of a live-commerce server in the case of a product sales method such as first-come-first-served basis in which a user's game activity time affects a selection of winners, and selecting winners by peer to peer (P2P) regardless of a time of the live-commerce server in the case of a product sales method such as a lottery or dice in which the user's game activity time does not affect the selection of winners.

According to an aspect of the present disclosure, a live-commerce system includes: a seller terminal equipped with a live-commerce application that allows a seller to produce a live-commerce video and progress a sale of a product; a user terminal equipped with the live-commerce application that has a function of receiving and playing the live-commerce video in a form of streaming data and allowing a user to purchase a product; and a live-commerce server configured to utilize a chat function between the seller terminal and the user terminal to progress a game selected as a method of selling a product by the seller, in which the live-commerce server delivers chat message including game information related to the selected game to the user terminal based on a time of the live-commerce server to control chatting and the game information to be displayed on the user terminal without a time difference through the chat function, and provides the seller terminal with a game list including one or more games selectable as a product sales method according to one or more of the number of users, a type of product to be sold, the number of products to be sold, and a method of providing a product.

According to another aspect of the present disclosure, a live-commerce method of determining a winner, who purchases a product sold by a seller or receives the product free of charge, among users watching a live-commerce broadcast through a game linked with a chat function includes: receiving, by a live-commerce server, a live-commerce video from a seller terminal and transmitting a real-time broadcast to a user terminal; providing, by the live-commerce server, the seller terminal with a game list including one or more games selectable as a product sales method according to one or more of the number of users, a type of products to be sold, the number of products to be sold, and a method of providing a product; and progressing, by the live-commerce server, a game selected from the game list by utilizing the chat function between the seller terminal and the user terminal, in which the progressing of the selected game includes delivering a chat message including game information related to the selected game to the user terminal based on a time of the live-commerce server to control chatting and the game information to be displayed on the user terminal without a time difference through the chat function.

Detailed contents of other exemplary embodiments are described in a detailed description and are illustrated in the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Throughout the specification, like reference numerals denote like elements. The present specification does not describe all elements of embodiments, and general content in the technical field to which the present disclosure pertains or content that overlaps between embodiments will be omitted.

The terms "unit," "module," "member," and "block" used in the specification may be implemented in software or hardware, and according to embodiments, a plurality of "units," "modules," "members," and "blocks" may be implemented as one component, or one "unit," "module," "member," and "block" can also include a plurality of components.

Throughout the specification, "connecting" any part to another part includes not only direct connection but also indirect connection, and the indirect connection includes connection through a wireless communication network.

In addition, unless explicitly described to the contrary, "including" any component will be understood to imply the inclusion of other components rather than the exclusion of other components.

Throughout the specification, when any member is referred to as being positioned "on" another member, it includes not only a case in which any member and another member are in contact with each other, but also a case in which still another member is interposed between any member and another member.

The terms "first," "second," and the like are used to distinguish one element from another element, and the elements are not defined by the above-described terms.

Singular forms are intended to include plural forms unless the context clearly makes an exception.

In each operation, an identification symbol is used for convenience of description, and the identification symbol does not describe the order of each operation, and each operation may be performed differently from the specified order unless the specific order is clearly stated in the context.

Hereinafter, embodiments of the present disclosure will be described with reference to the accompanying drawings.

Figure 1:
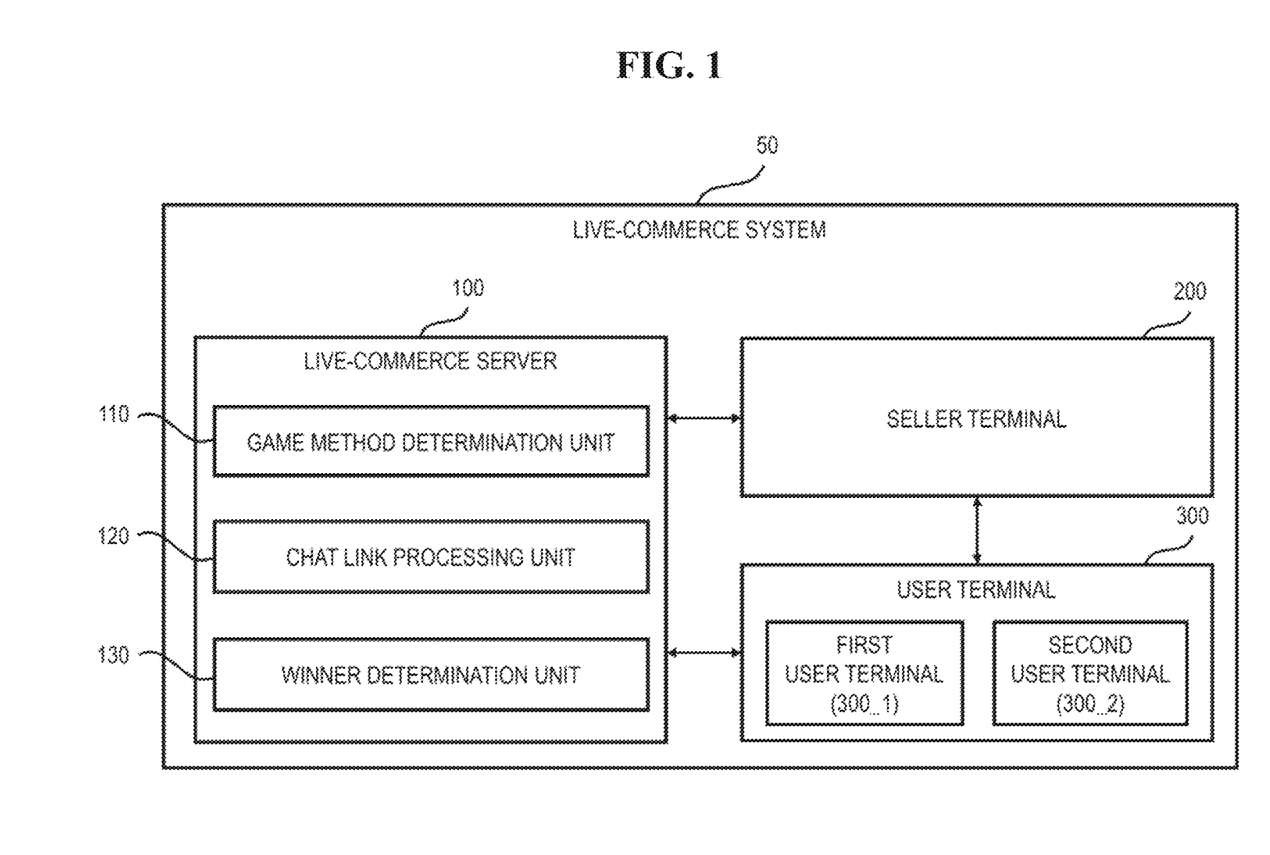
FIG. 1 is a diagram for describing an operation of a live-commerce system according to an embodiment of the present disclosure.

FIG. 1 is a diagram for describing an operation of a live-commerce system according to an embodiment of the present disclosure.

Referring to FIG. 1, a live-commerce system 50 may include a live-commerce server 100, a seller terminal 200, and a user terminal 300. The user terminal 300 may include a first user terminal 300_1 and a second user terminal 3002.

The live-commerce system 50 may provide the seller terminal 200 with an environment in which a seller may install a live-commerce application. The seller may progress a live-commerce broadcast through the live-commerce application and may progress a sale of products and/or items. Here, progressing the live-commerce broadcast may include one or more of producing, uploading, and transmitting a live-commerce broadcast video by a seller. Progressing the sale of products and/or items may include performing a connection to a shopping mall.

In addition, the live-commerce system 50 may provide the user terminal 300 with an environment in which a user may install a live-commerce application. The user may directly receive and play the live-commerce video from the seller terminal 200 through the live-commerce application or may receive and play the live-commerce video passed through the live-commerce server 100 in the form of streaming data. In addition, the user may purchase products and/or items through the application.

Examples of a target of sale in live-commerce include real estate and intangible assets in addition to movable assets such as products and items. Hereinafter, for convenience of description, an example case where the target of sale of live-commerce is a product will be described.

The live-commerce may allow a user to indirectly experience the quality of products through video without the user actually visiting a store. The live-commerce is different from the existing home shopping and Internet shopping in that a seller and a user can communicate in real time.

The video includes video data and audio data. According to an embodiment, an access address for accessing the live-commerce server 100 is inserted into the audio data, and a product code is inserted into a product on the video data. Accordingly, a user accesses the live-commerce server 100 to more easily obtain the product code. A more detailed description thereof is as follows.

For example, it is assumed that the first user terminal 300_1 is displaying the live-commerce broadcast, and the second user terminal 300_2 is not displaying the live-commerce broadcast but is located in the vicinity of the first user terminal 300_1. It is assumed that a first-come-first-served game is selected as a product sales method during the live-commerce broadcast.

In this case, when the second user terminal 300_2 wants to participate in the first-come-first-served game, the second user terminal 300_2 first scans the audio data of the video to obtain the access address inserted into the audio data. When the live-commerce server 100 is accessed based on the obtained access address, the second user terminal 300_2 scans the product on the video data and extracts the product code inserted into the product. According to an embodiment, the product code may be inserted into a product or a subsidiary material attached to the product. In addition, the product code may include a plurality of halftone dots, and each halftone dot may also be composed of one or more halftone dots.

According to an embodiment, information on halftone dots constituting the product code may vary depending on a type of product or a type of subsidiary material attached to the product. Here, the halftone dot information may include one or more of the number of halftone dots, a size of each halftone dot, a color of each halftone dot, a pattern of each halftone dot, a spacing range (minimum and maximum spacing) between the halftone dots, and an arrangement form of the halftone dots, but is not limited to those that have been exemplified.

For example, when a type of product is metal or a subsidiary material attached to the product is metal, ten halftone dots having different sizes may be formed on the product or the subsidiary material as a product code. In order to form a metal product or a metal subsidiary material into which the product code is inserted, a mold in which ten halftone dots having different sizes are formed on an inner side surface may be used. In addition to the method using the mold, a method of attaching a sticker printed with halftone dots to metal may be used.

As another example, when the type of product is a fiber, five halftone dots having different sizes may be formed on the fiber as a product code. In order to form the fiber into which such a product code is inserted, when printing a specific shape (for example, pattern, character, etc.) on the corresponding fiber, a method of printing five halftone dots having different sizes together may be used.

As described above, when a product code composed of a plurality of halftone dots is inserted into a product sold through live-commerce, the user of the second user terminal 300_2 may check a product which is on a live-commerce broadcast, and then extract a product code from the product simply by scanning a screen on which the product is displayed. Accordingly, the second user terminal 300_2 may purchase the product through the product purchase information corresponding to the product code even if the user does not watch the live-commerce broadcast. In particular, even when the product sales method selected by the seller during the live-commerce broadcast is the first-come-first-served game, the user of the second user terminal 300_2 may purchase the product through the product purchase information corresponding to the product code.

In such live-commerce, it is important for users to feel that the users are actually participating in the live-commerce broadcast by actively introducing an interaction element between sellers and the users. To this end, various methods such as performing missions provided by users or receiving donations from users are being tried in the live-commerce broadcast.

The live-commerce system 50 according to the embodiment of the present disclosure may increase a user's inflow rate and purchase rate by introducing game elements utilizing a chat function of the live-commerce. Specifically, the live-commerce system 50 is a system that may allow users to participate in games that sellers propose or select as a product sales method and when winners are determined, the winners may receive the product.

In an embodiment, the chat function may include all means for exchanging information between a seller and a user, as well as a chat screen displayed on the chat window at a bottom of the live-commerce broadcast. That is, a method of delivering a pop-up message to a user or communicating through a chatting application or text message other than a live-commerce application may be included.

The live-commerce server 100 may include a game method determination unit 110, a chat link processing unit 120, and a winner determination unit 130.

The game method determination unit 110 may communicate with the seller terminal 200 to determine a game to be used as a product sales method. The progress of the determined game may be displayed on the user terminal 300 in real time through the chat link processing unit 120. Users may check past game logs and monitor a process of selecting winners through the chat function. The winner determination unit 130 may integrally manage the progress of a game and finally determine winners.

Specifically, the game method determination unit 110 may determine a game list including one or more games selectable as the product sales method according to a type of product to be sold, the number of products to be sold, a method of providing products, the number of users, etc. In addition, the determined game list may be provided to the seller. According to the embodiment, the game list determined by the game method determination unit 110 may be sorted according to a recommendation ranking and provided to a seller.

Hereinafter, in the embodiment of the present disclosure, "auction", "lottery," and "first-come-first-served basis" will be described as examples of a game used when selling a product, that is, a game selectable as the product sales method. However, the game selectable as the product sales method is not limited thereto, and may include any type of game that may be implemented on the web or mobile.

The game method determination unit 110 may receive product information from the seller terminal 200 and determine a game list including one or more games selectable as the product sales method by referring to the product information and/or the number of users. Here, the product information may include one or more of the category, number, price, and sales purpose of products. A method of determining, by a game method determination unit 110, a game list will be described in more detail below.

For example, the price of a seller's personal collection having high scarcity may be set according to a purchase value considered by a user. Accordingly, the game method determination unit 110 may provide a game list including "auction" to the seller terminal 200 as a game selectable as a product sales method. As a result, the "auction" is used to allow the sale of the product to proceed.

In this case, when the number of products to be sold is limited, the number of products that can be supplied to a user is limited. Therefore, the game method determination unit 110 may provide the seller terminal 200 with a game list further including "lottery", "first-come-first-served basis," and "dice" in addition to the "auction" as the game selectable as the product sales method. In this case, the game method determination unit 110 may preferentially provide an "auction" as an optimal sales method in consideration of the scarcity of the product to be sold.

Conversely, when the number of products to be sold is greater than or equal to a certain number, the likelihood that users will bid at a high price is low. Accordingly, the game method determination unit 110 may provide the seller terminal 200 with the game list including "lottery" and/or "first-come-first-served basis" as the game selectable as the product sales method. In this case, when both the "lottery" and "first-come-first-served basis" are included in the game list, the game method determination unit 110 may preferentially provide either one as the optimal sales method.

In the above embodiment, when the game provided by the game method determination unit 110 as a game used during a sale of products is the first-come-first-served basis, the first user terminal 300_1 scans audio data provided from the live-commerce server 100 to extract the access address for accessing the live-commerce server 100. Then, the live-commerce server 100 is accessed using the extracted access address. Thereafter, the first user terminal 300_1 may scan a product on video data to extract a product code, and then provide a product purchase request message including the product code to the live-commerce server 100.

In this case, since, for example, a product code including a plurality of halftone dots having different sizes is inserted into a product sold through the live-commerce, the first user terminal 300_1 may scan the product on the video data to extract the product code. The process of extracting the product code will be described in more detail as follows.

For example, when a plurality of halftone dots having different sizes are extracted by scanning the product on the video data, the first user terminal 300_1 determines a binary value corresponding to each halftone dot based on the number of dots constituting each halftone dot. To this end, the first user terminal 300_1 may refer to a table of binary values for each halftone dot. The table includes the number of dots constituting a halftone dot and binary values corresponding thereto.

For example, it is assumed that, in the table of binary values for each halftone dot, the binary value is stored as 1 for a first halftone dot composed of 4 dots, and the binary value is stored as 0 for a second halftone dot composed of 8 dots. It is assumed that one first halftone dot and six second halftone dots are extracted from the product on the video data. In this case, the first user terminal 300_1 determines a binary value for the first halftone dot extracted from the video as 1, and determines a binary value for the second halftone dot extracted from the video as 0. Thereafter, the first user terminal 300_1 may generate product code "1000000" by sequentially combining the determined binary values.

Meanwhile, the game list provided to the seller may include only games that are determined by the game method determination unit 110 and then sorted according to priority, and may include all games provided by the live-commerce system 50. In the former case, the type of games that the seller may select is limited by the game method determination unit 110. In the latter case, since all types of games are included in the game list, the seller may select their desired games regardless of the type of games.

Thereafter, the game method determination unit 110 may receive the game method selected by the seller from the seller terminal 200 and transmit the received game method to the chat link processing unit 120 to notify users of the start of the game through the chat function. In addition, the game method determination unit 110 may transmit the received game method to the winner determination unit 130 to control the game to progress.

The chat link processing unit 120 may control game information including one or more of the start, progress, end, and winner information of the game to be displayed on the first user terminal 300_1. The operation of the chat link processing unit 120 may be understood with reference to the description of FIGS. 2 to 4.

Figure 2:
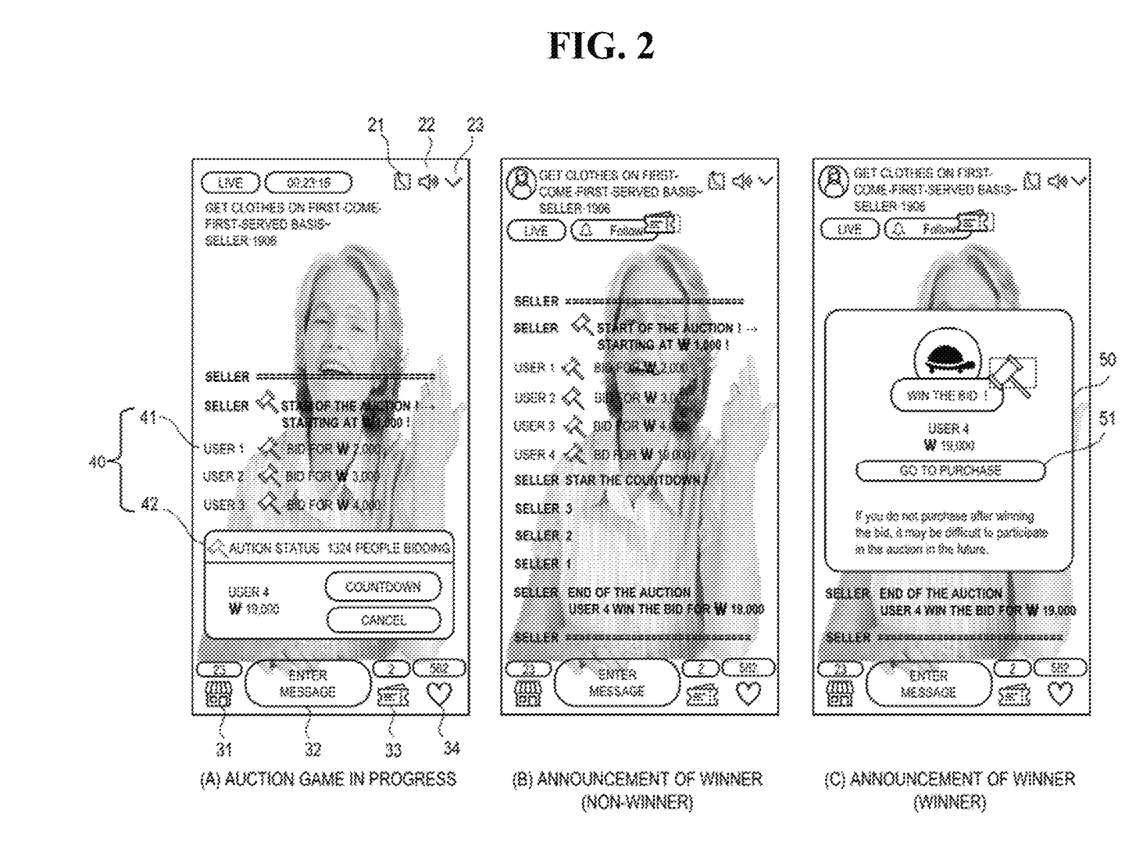
FIG. 2 is a diagram for describing an auction game according to an embodiment of the present disclosure.

FIG. 2 is a diagram for describing an auction game according to an embodiment of the present disclosure.

FIG. 2A is a diagram illustrating an example of a screen displayed through the seller terminal 200. FIG. 2B is a diagram illustrating an example of a screen displayed through the seller terminal 200 and/or the user terminal 300. FIG. 2C is a diagram illustrating an example of a screen displayed through the user terminal 300.

Referring to FIG. 2A, information and menu icons related to the live-commerce broadcast are arranged on an upper portion of the screen.

A title (for example, "Get clothes on first-come-first-served basis—") of the live-commerce broadcast, the time (for example, "00:23:15") the live-commerce broadcast is progressed, a seller's nickname (for example, "Jazz Sister"), the number (for example, "1906") of users watching the live-commerce broadcast, and the like are displayed at an upper left portion of the screen.

Menu icons 21, 22, and 23 are displayed at an upper right portion of the screen. For example, the icon 21 that may deliver information on the corresponding live-commerce broadcast to other users, an icon 22 that may adjust a volume of the live-commerce broadcast, a drop-down icon 23 that may display icons related to other functions, and the like are displayed.

A chat window 40 is displayed at a lower portion of the screen. Messages 41 input by the sellers and/or users through a message input window 32 are sequentially displayed at an upper portion of the chat window 40. A game status information display window 42 may be displayed at a lower portion of the chat window 40. The game status information display window 42 may include the number of users participating in a bid, a highest bid price, a nickname of a user who offers the highest bid price, a countdown icon, and a cancel icon.

A height of the chat window 40 may be adjusted automatically. For example, when the number of messages to be displayed through the chat window 40 for a reference time is less than a reference value, the height of the chat window 40 may be maintained at a reference length. When several users input messages almost simultaneously and the number of messages to be displayed through the chat window 40 for the reference time exceeds a reference value, the height of the chat window 40 may become longer than the reference length.

A store icon 31, a message input window 32, a coupon icon 33, and a heart icon 34 may be sequentially arranged at a bottom portion of the screen. For example, the number of products to be sold may be displayed around the store icon 31. The number of available coupons may be displayed around the coupon icon 33. A number may be displayed around the heart icon 34, and this number may be the number of times the heart icon is selected by users.

According to the embodiment, the seller may set an auction starting price before starting an auction and start the auction. As an example, the seller may start the auction by inputting a message, which includes a word notifying the start of the auction and the auction start price, to the message input window 32. In this case, a word may be recognized from a message input by a seller, and an auction game may be started based on the recognition result. As another example, the seller may start the auction by selecting an auction game item from the game list provided from the live-commerce server 100 and then inputting the auction start price.

FIG. 2A illustrates a screen displayed through the seller terminal 200 while the auction game is in progress. While the auction game is in progress, users may bid by setting a bid price. The bid price set by the users is displayed on the chat window 40. Meanwhile, when it is determined that there are no more bids, the seller may select the countdown icon to start the countdown.

When the countdown icon is selected, a preset countdown time is displayed on the chat window 40 as illustrated in FIG. 2B. When another user offers a bid price higher than the highest bid price within the countdown time, the countdown ends and the auction may resume. This process may be repeated until a successful bidder appears. When there is no additional bid within the countdown time, a user who offers the highest bid price may be determined as a successful bidder and the auction may end. Here, the successful bidder may be a winner.

When a successful bidder is determined because there is no additional bid within the countdown time, information on a successful bidder, that is, information on a winner may be displayed through the chat window 40 in text format. FIG. 2B illustrates a state in which information on a winner such as a winner's nickname and a successful bid price are displayed on the chat window in text format. FIG. 2B may be a screen displayed through the user terminal 300 of a non-winner and a winner.

As illustrated in FIG. 2B, after the information on the winners in text format is displayed in the chat window 40, a result window notifying that a bid is successful in the auction game may be popped-up in the screen of the winner. FIG. 2C illustrates a pop-up state of the result window 50 through the user terminal 300 of the winner. The result window 50 may include one or more of a winner's nickname, a successful bid price, an image of a winning bid product, a guidance message related to the winning bid product, and a go to purchase icon 51. When the winner selects a go to purchase icon 51, a screen to purchase the winning bid product may be displayed.

Meanwhile, an example of the live-commerce broadcast screens is illustrated in FIG. 2, and screens capable of progressing an auction game may be implemented on a mobile device in various forms. Specifically, the number of pieces of information, the type of information, the number of icons, the types of icons, and the like that are displayed on the live-commerce broadcast screen may be changed. Also, the arrangement positions of information displayed on the screen, icons 21, 22, 23, 31, 33, and 34, the message input window 32 and the chat window 40 may also be variously changed. In addition, it may be implemented so that a seller or a user may directly set such a change. For example, the arrangement position and/or size of the chat window 40 may be implemented to be adjustable by a seller or a user. In this case, a seller or a user may adjust the arrangement position and/or size of a chat window 40 according to his/her taste or convenience.

Figure 3:
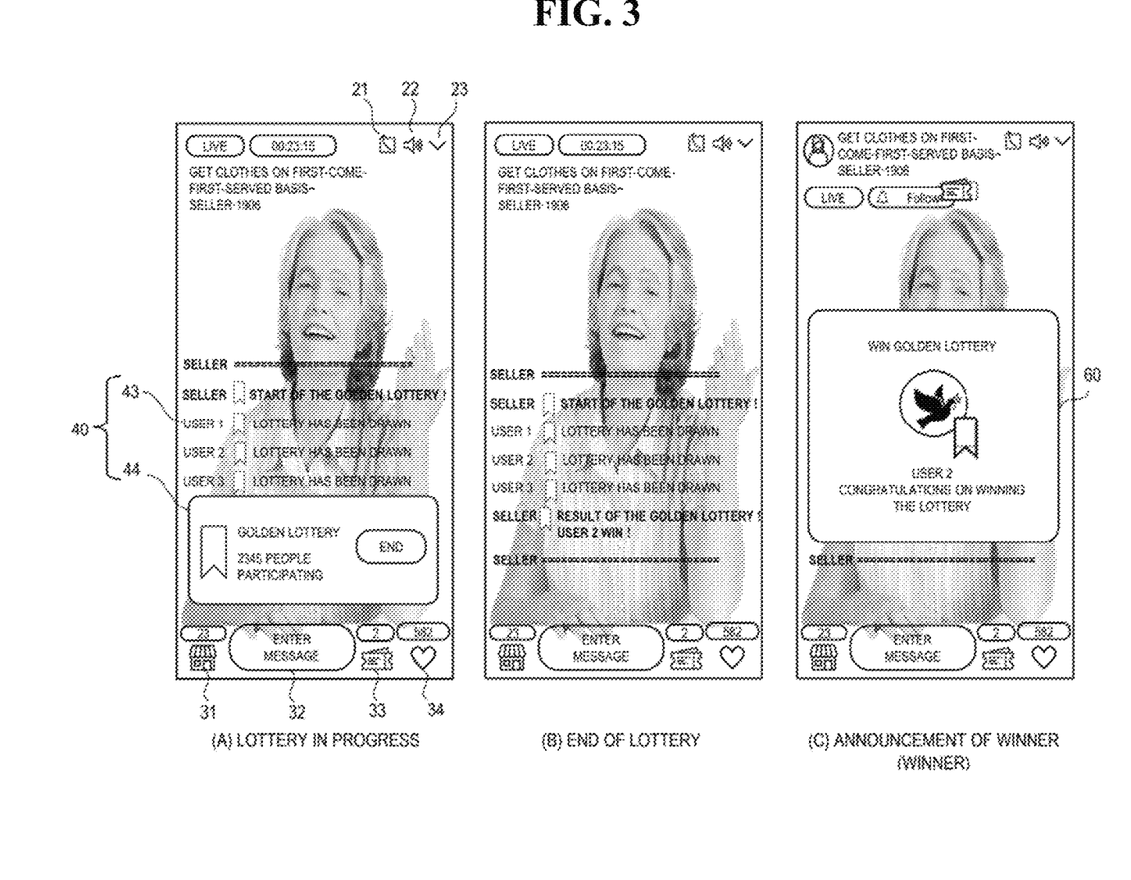
FIG. 3 is a diagram for describing a lottery game according to an embodiment of the present disclosure.

FIG. 3 is a diagram for describing a lottery game according to an embodiment of the present disclosure.

FIG. 3A is a diagram illustrating an example of a screen displayed through the seller terminal 200. FIG. 3B is a diagram illustrating an example of a screen displayed through the seller terminal 200 and/or the user terminal 300. FIG. 3C is a diagram illustrating an example of a screen displayed through the user terminal 300.

According to an embodiment, a seller may start the lottery game in various ways. As an example, a seller may start the lottery game by inputting a message including a word notifying the start of the lottery to the message input window 32. In this case, a word may be recognized from a message input by a seller, and the lottery game may be started based on the recognition result. As another example, the seller may start the lottery game by selecting a lottery game item from the game list provided from the live-commerce server 100.

When the lottery game starts, a lottery is provided to users en bloc. As a result, although not shown in the drawing, a lottery execution icon may be displayed at the lower portion of the chat window 40 on the screen of the user terminal 300. When the lottery execution icon is selected by the user, a response signal according to the selection of the lottery execution icon is transmitted to the live-commerce server 100. As a result, the message "lottery has been drawn" is displayed on the chat window 40 along with a user's nickname.

FIG. 3A illustrates a screen displayed through the seller terminal 200 while the auction game is in progress. A message 43 notifying the results of executing the lottery by users is sequentially displayed at the upper portion of the chat window 40. In this case, for a user who drew a non-winning lot, a message indicating that the lottery execution has been completed (for example, "lottery has been drawn") is displayed on the chat window 40 along with the user's nickname. For a user who drew a winning lot, a message (for example, "Win Golden Lottery") notifying winning is displayed on the chat window 40 along with the user's chat name.

According to the embodiment, the user who drew the winning lot and the user who drew the non-winning lot are separately displayed on the chat window 40. For example, the nickname and/or message of the user who drew a winning lot may be highlighted compared to the nickname and/or message of the user who drew the non-winning lot. As the highlighting method, a method of displaying a different color and/or a font size, a method of displaying a pictogram, or the like may be exemplified.

Meanwhile, the game status information display window 44 may be displayed at the lower portion of the chat window 40. The game status information display window 44 may include the number of users participating in the lottery game and the end icon. A seller may end the lottery game at any time by selecting the end icon. For example, when the lottery game no longer proceeds or the lottery of users is completed, the seller may select the end icon to end the lottery game. The completion of the lottery of users may mean that all users participating in the lottery game have executed the lottery, or mean a case in which a user who drew a winning lot occurs before all users participating in the lottery game execute the lottery. When the lottery game ends, a screen as illustrated in FIG. 3B may be displayed on the seller terminal 200 and/or the user terminal 300. FIG. 3B illustrates a state in which the message notifying the result of the lottery game and the end of the lottery game is displayed through the chat window 40.

As illustrated in FIG. 3B, after the message notifying the result of the lottery game and the end of the lottery game is displayed in the chat window 40, a result window 60 notifying the winning of the lottery game may be popped-up in the screen of the winner. FIG. 3C illustrates the state in which the result window 60 is popped-up. One or more of a winner's nickname, a winner's profile images, and a winning guidance message may be included in the result window 60.

Meanwhile, an example of the live-commerce broadcast screens is illustrated in FIG. 3, and the screens capable of progressing the lottery game may be implemented on a mobile device in various forms.

Figure 4:
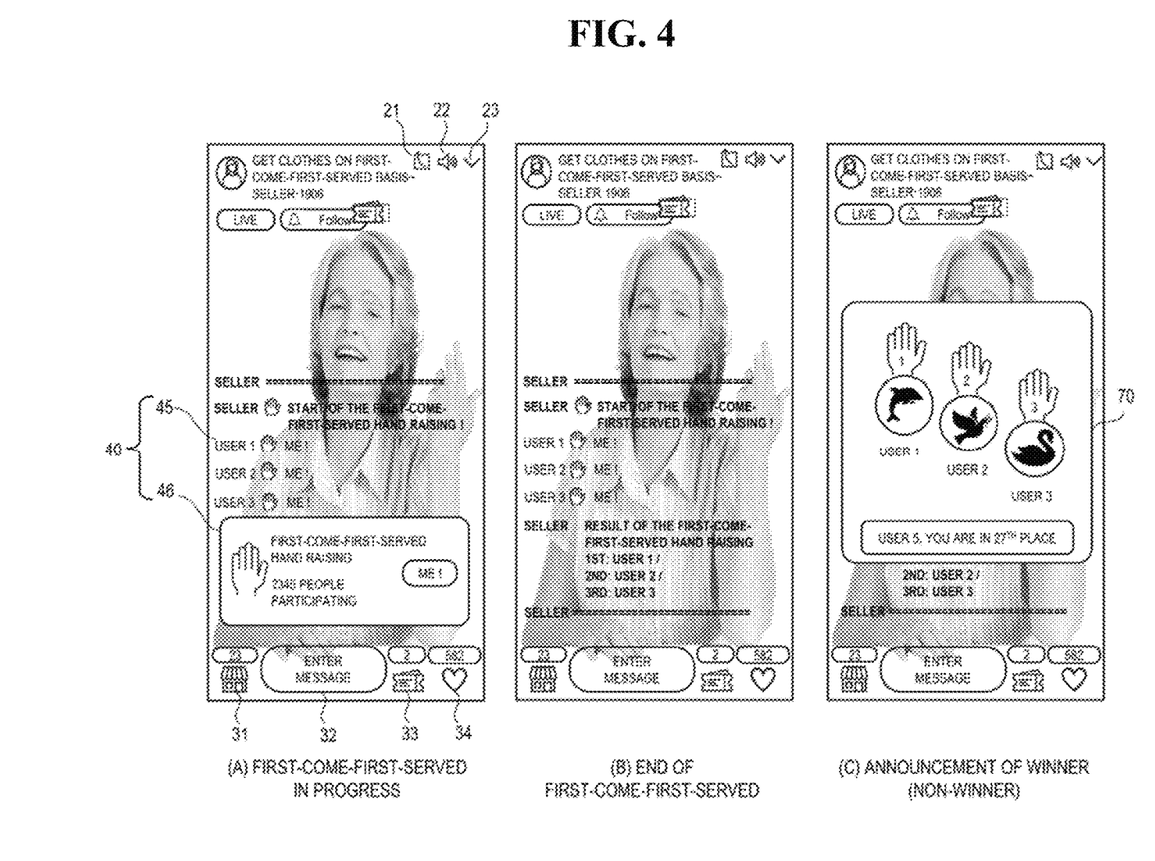
FIG. 4 is a diagram for describing a first-come-first-served game according to an embodiment of the present disclosure.

FIG. 4 is a diagram for describing a first-come-first-served game according to an embodiment of the present disclosure.

FIG. 4A is a diagram illustrating an example of a screen displayed through the user terminal 300. FIG. 4B is a diagram illustrating an example of a screen displayed through the seller terminal 200 and/or the user terminal 300. FIG. 4C is a diagram illustrating an example of a screen displayed through the user terminal 300.

According to the embodiment, the seller may start the first-come-first-served game in various ways. For example, the seller may start the first-come-first-served game by inputting the message including the word notifying the start of the first-come-first-served game to the message input window 32. In this case, a word may be recognized from the message input by the seller, and the first-come-first-served game may be started based on the recognition result. As another example, the seller may start the first-come-firstserved game by selecting the first-come-first-served game item from the game list provided from the live-commerce server 100.

FIG. 4A illustrates the screen displayed through the user terminal 300 when the first-come-first-served game is in progress. A message 45 indicating results of users' first-come-first-served responses are sequentially displayed. A game status information display window 46 may be displayed at a lower portion of the chat window 40. The game status information display window 46 may include the number of users participating in the first-come-first-served game and a first-come-first-served response icon. When the user selects the first-come-first-served response icon, a response signal according to the selection is transmitted to the live-commerce server 100. As a result, the user's nickname and the message "Me" is displayed on the chat window 40 together.

Meanwhile, although not illustrated in the drawing, a game status information display window may also be displayed in the chat window 40 of the screen displayed through the seller terminal 200. For example, a game status information display window similar to the game status information display window 44 illustrated in FIG. 3A may be displayed. Accordingly, the seller may end the first-come-first-served game at any time by selecting the end icon displayed in the game status information display window. When the seller ends the first-come-first-served game at any time, a message notifying the end of the first-come-first-served game, winners, first-come-first-served ranking of winners, and the like may be displayed on the chat window 40 of the seller terminal 200 and the user terminal 300. FIG. 4B illustrates a state in which the message notifying the results and winners of the first-come-first-served game is displayed through the chat window 40.

After the screen as illustrated in FIG. 4B is displayed, a result window 70 may be popped-up in the screen of the user terminal 300. In this case, the result window notifying the winning of the first-come-first-served game may be popped-up in the user terminal 300 of the winner among the users. In addition, the users' first-come-first-served ranking may be further displayed in the result window 70 in the user terminal 300 of the non-winner among the users. FIG. 4C illustrates a state in which the result window 70 is popped up in the user terminal 300 of the non-winner. It can be seen that the first-come-first-served rankings of the users who are non-winners are displayed in the result window 70 along with nicknames of winners corresponding to first, second, and third places.

Meanwhile, an example of the live-commerce broadcast screens is illustrated in FIG. 4, and screens capable of progressing a first-come-first-served game may be implemented on mobile in various forms.

The operation of the chat link processing unit 120 has been described above with reference to FIGS. 2 to 4. In the above embodiment, the example case where the chat link processing unit 120 controls game information to be displayed on the chat window 40 has been described. According to another embodiment, the chat link processing unit 120 may control game information not to be displayed on the chat window 40 according to the type of game and/or the game environment.

For example, when the number of users participating in the game exceeds 10,000, the game information displayed on the chat window 40 is too large, so the game information may not be checked one by one, and in severe cases, the broadcast may be cut off. To prevent this, the chat link processing unit 120 may control game information not to be exposed to the chat window 40 in the preset game type and/or environment.

The chat link processing unit 120 may determine that a seller and a user have participated in the game simply by inputting game activity according to a predefined rule to the chat window 40 through the message input window 32. For example, when a user inputs "#bid 19,000 won" or "#bid 19,000" in the message input window 32 while the auction game is in progress, it may be determined that the bid is made at a bid price of 19,000 won. As another example, when a user inputs "#Me!" to the chat window 40 through the message input window 32, it may be determined that his/her winning intention has been delivered while the first-come-first-served game is in progress. Referring to the above-described examples, it can be seen that the predefined rule continuously inputs "#" and "predefined word." However, the predefined rule is not limited to the case of using "#," and may be variously changed. For example, a first-come-first-served response icon may be displayed on the chat window 40 of the user terminal. In this case, when a user selects the first-come-first-served response icon while the game is in progress, it may be determined that his/her winning intention has been delivered. That is, the user may deliver his/her winning intention simply by selecting the first-come-first-served response icon instead of inputting a predefined combination of symbols and words.

The winner determination unit 130 may perform an operation for progressing a game and determining winners. The winner determination unit 130 may be linked with the chat link processing unit 120 to notify a user of the game progress status and/or the game status in real time through the chat function.

In all the games performed in the present disclosure, basically, a time difference between the seller and the user should not occur, and the game should be progressed between all users and the sellers at the same time, and the game results should be displayed on the chat window 40 at the same time. To this end, the live-commerce server 100, the seller terminal 200, and the user terminal 300 go through a synchronization process before the live-commerce broadcast is performed.

The chat link processing unit 120 may deliver a chat message including game information to the user terminal 300 to control the chatting and game information to be displayed on the user terminal 300 without the time difference. The game information may include one or more of game start information, winner information, and game status information.

The game information is sorted based on the time of the live-commerce server 100 and is included in a chat message and delivered to the user terminal 300. Accordingly, the game information may be displayed on the chat window 40 of the user terminal 300, which has received the chat message, in the chat message format.

In addition, since the game information is sorted based on a unified time of the live-commerce server 100 and delivered to the user terminal 300, a chat message including the same game information may be displayed at the same time without a time difference even between a plurality of user terminals 300.

Also, among the exemplified games, there is a game in which a user's game activity time is an important winning factor. For example, in the case of the first-come-first-served game, users transmit their winning intention at a time interval shorter than 1 second. Therefore, there is a need to more accurately synchronize time between sellers and users located in different network environments.

According to an embodiment, the live-commerce system 50 may control timing of game activities by differently adjusting an intervention rate of the live-commerce server 100 according to the type of game being progressed.

In a general situation, the seller terminal 200 and the user terminal 300 progress a game while communicating through the live-commerce server 100. Operations such as game method determination, game progress, and winner determination are performed through the live-commerce server 100, and the communication between the seller terminal 200 and the user terminal 300 is minimized.

In a situation in which the live-commerce server 100 intervenes, each user terminal 300 transmits responses related to bidding, first-come-first-served hand raising, and lottery operations to the live-commerce server 100. In addition, the live-commerce server 100 records the time when a response is transmitted from the user terminal 300, and may collectively control so that the same result may be viewed in the chat window 40 of all users.

According to another embodiment, the live-commerce system 50 may directly connect the seller terminal 200 and the user terminal 300 in a peer-to-peer (P2P) method by excluding or minimizing the intervention of the live-commerce server 100.

There are largely two methods as the P2P method. One is a method of realizing a connection between users with some help from the live-commerce server 100. The other is a method in which users are directly connected without going through the live-commerce server 100 by sharing personal information such as an Internet protocol (IP address) with each other in advance.

In the embodiment, the live-commerce system 50 may minimize the intervention of the live-commerce server 100 in a case of a game (for example, first-come-first-served game) in which a time becomes an important winning criterion, and control a game to be progressed through a direct connection between the seller terminal 200 and the user terminal 300. To this end, each operation of the game method determination unit 110, the chat link processing unit 120, and the winner determination unit 130 of FIG. 1 may be configured to be independently operated without the intervention of the live-commerce server 100 through a live-commerce application installed in the seller terminal 200 and the user terminal 300.

For example, the intervention rate of the live-commerce server 100 may be adjusted according to the type of game. As another example, the intervention rate of the live-commerce server 100 may be adjusted according to the type of game and the number of users watching the live-commerce broadcast. For example, as the number of users watching the live-commerce broadcast increases, the intervention rate of the live-commerce server 100 may increase, thereby improving the game environment and providing seamless broadcasting.

The winner determination unit 130 may determine the game progress method according to a selection of a seller or a user when the game progress result is that a greater number of users than the number of products to be sold win. For example, 1) the same game may be progressed again from the beginning, 2) the game may be progressed again between tied users, or 3) a concession may be proposed or other winners may be rewarded and encouraged to give up.

The winner determination unit 130 may provide the determined winner information to the user terminal 300 at the same time through the chat window 40. Alternatively, the winner information may be provided by simultaneously popping-up the result windows 50, 60, and 70 including the winner information through the user terminal 300.

Figure 5:
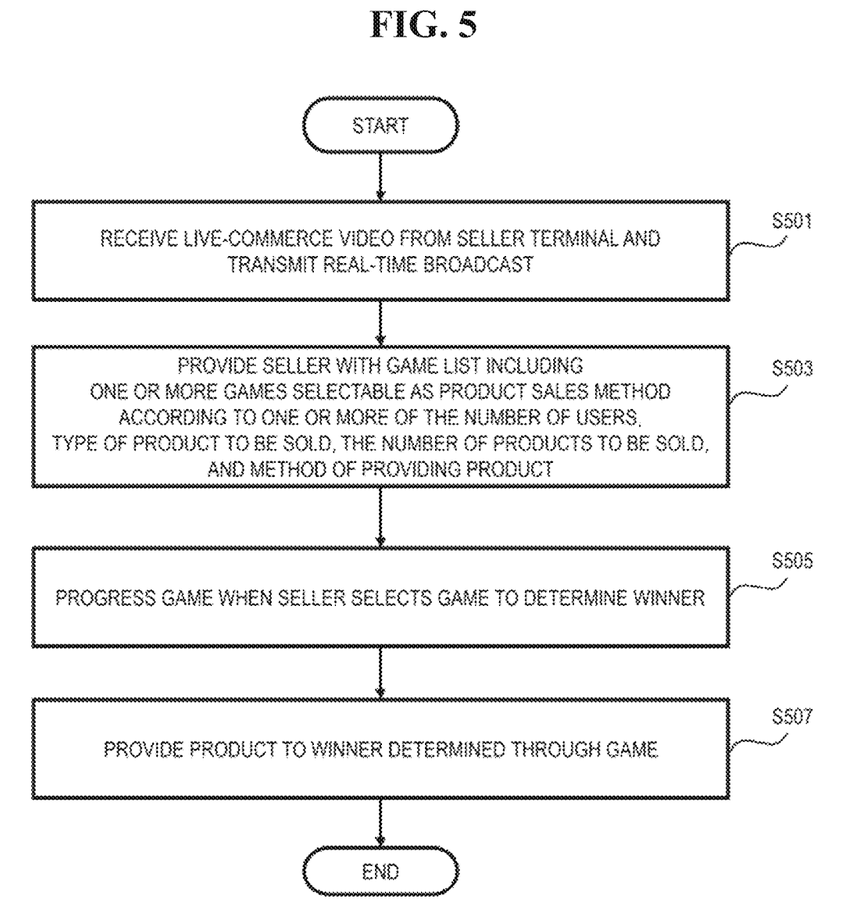
FIG. 5 is a flowchart for describing a live-commerce method according to an embodiment of the present disclosure.

FIG. 5 is a flowchart for describing a live-commerce method according to an embodiment of the present disclosure. FIG. 5 may be understood as a flowchart illustrating an operation method of the live-commerce server 100.

Referring to FIG. 5, in operation S501, the live-commerce server 100 may receive the live-commerce video from the seller terminal 200 and transmit a real-time broadcast. The live-commerce broadcast is made between a seller and a user in real time, and the communication method used for video transmission and reception is not limited.

In operation S503, the live-commerce server 100 may provide a seller with a game list including one or more games selectable as the product sales method according to one or more of the number of users, the types of products to be sold, the number of products to be sold, and the method of providing products. For example, the price of a seller's personal collection having high scarcity may be set according to a purchase value considered by a user. Accordingly, the live-commerce server 100 provides a seller with a game list including "auction" as selectable games, and as a result, the sale of the product may proceed through the auction. When the number of products that can be supplied is limited, the live-commerce server 100 may provide a seller with a list of games further including lottery, first-come-first-served basis, and dice in addition to auction, as selectable games. In this case, the live-commerce server 100 may sort the games included in the game list according to the priority, and arrange and provide the auction with the highest priority in consideration of the scarcity of the product.

In operation S505, when a seller selects a game to determine winners from among the games included in the game list, the live-commerce server 100 may progress the game.

In operation S507, the live-commerce server 100 may provide a product to the winners determined through the game.

In the above description, it is assumed and described that the above-described operations S501 to S507 are performed through the live-commerce server 100. According to another embodiment, the above-described operations S501 to S507 may be performed using the P2P method in which the user terminal 300 and the seller terminal 200 are directly connected without going through the live-commerce server 100 according to the type of game being progressed. The live-commerce applications installed in each of the user terminal 300 and the seller terminal 200 may provide functions for this purpose.

Figure 6:
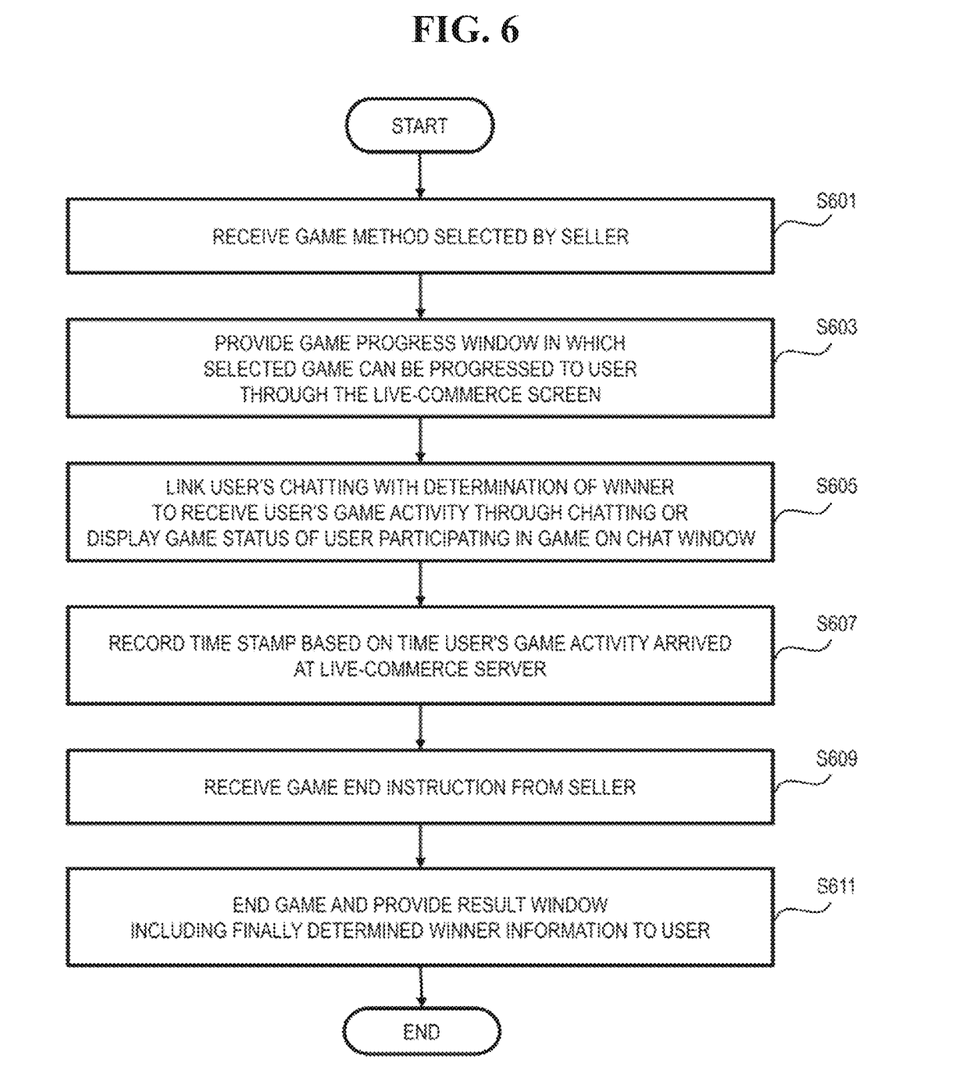
FIG. 6 is a diagram for describing operation S505 of FIG. 5 in more detail.

FIG. 6 is a diagram for describing operation S505 of FIG. 5 in more detail.

Referring to FIG. 6, in operation S601, the live-commerce server 100 may receive the game method selected by the seller from the seller terminal 200 and start a process for executing the game.

In operation S603, the live-commerce server 100 may provide a game progress window through which the selected game may be progressed to the user through the live-commerce screen. According to an embodiment, the game function and the chat function are linked. Accordingly, a user may check the progress of the game in real time through the chat window 40.

In operation S605, the live-commerce server 100 may link the user's chatting with a determination of a winner to receive user's game activity through chatting or display a game status of a user participating in a game on the chat window 40.

In operation S607, the live-commerce server 100 records a time stamp based on the time when the user's game activity arrives at the live-commerce server 100.

In operation S609, the live-commerce server 100 may end the game upon receiving an instruction to end the game from the seller.

In operation S611, the live-commerce server 100 may end the game and provide a result window including information on finally determined winners to a user. For example, when the game progress result is that there are a greater number of winners than the number of products to be sold, a seller may progress the same game again from the beginning, progress the game again between the winners, propose a concession to some winners, or pay a reward to the winners who make concessions. When the winners are finally determined through this process, the live-commerce server 100 provides a user with a result window including information on finally determined winners.

In this case, the result window may be configured differently for each game. For example, when the progressed game method is an auction, the result window 50 illustrated in FIG. 2C may be provided to a user. When the progressed game method is a lottery, the result window 60 illustrated in FIG. 3C may be provided to the user. When the progressed game method is first-come-first-served basis, the result window 70 illustrated in FIG. 4C may be provided to a user.

The live-commerce system and method according to the embodiment of the present disclosure have been described above with reference to FIGS. 1 to 6. Hereinafter, an exemplary computing device capable of implementing the live-commerce server 100 according to some embodiments of the present disclosure will be described with reference to FIG. 7.

Figure 7:
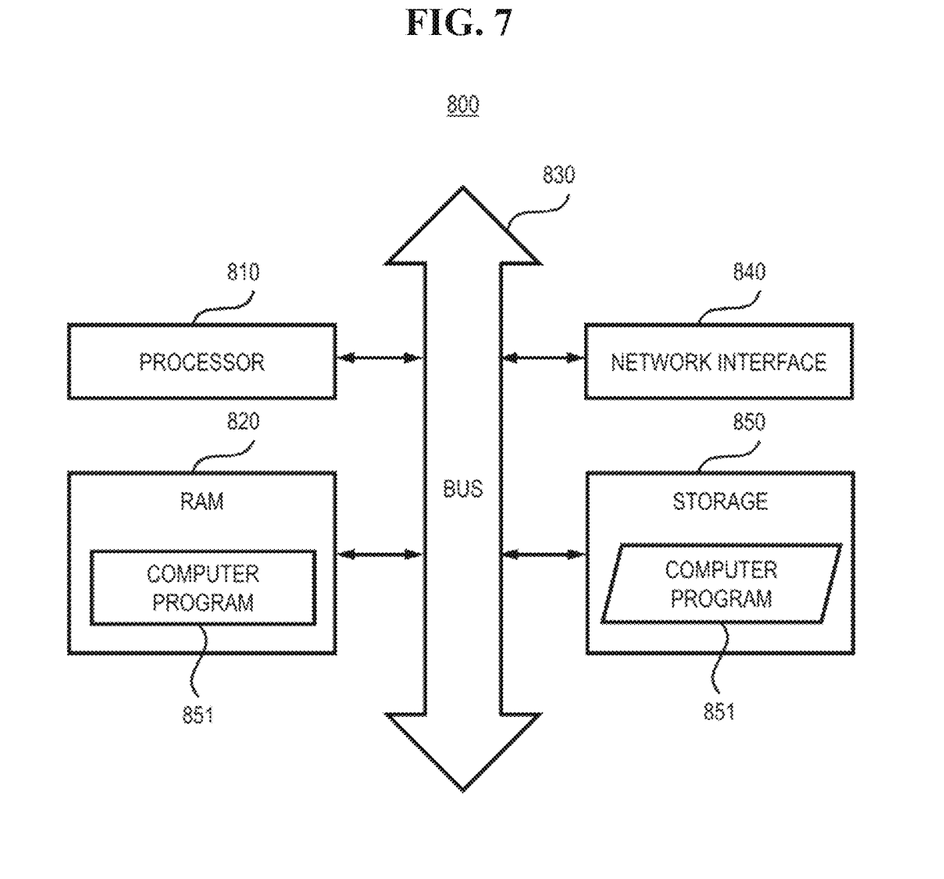
FIG. 7 is a hardware configuration diagram of a computing device capable of implementing a live-commerce server, according to some embodiments of the present disclosure.

Referring to FIG. 7, a computing device 800 may include one or more processors 810, a storage 850 for storing a computer program 851, a memory 820 into which a computer program 851 executed by the processor 810 is loaded, a bus 830, and a network interface 840. However, only the components related to the embodiment of the present disclosure are illustrated in FIG. 7. Accordingly, one of ordinary skill in the art to which the present disclosure pertains may know that other general-purpose components other than those illustrated in FIG. 7 may be further included.

The processor 810 controls the overall operation of each component of the computing device 800. The processor 810 may be configured to include a central processing unit (CPU), a micro processor unit (MPU), a micro controller unit (MCU), a graphic processing unit (GPU), or any type of processor well known in the technical field of the present disclosure. Also, the processor 810 may perform an operation on at least one computer program for executing the live-commerce method according to embodiments of the present disclosure. The computing device 800 may include one or more processors.

The memory 820 stores data for supporting various functions of the computing device 800. The memory 820 stores a plurality of computer programs (app, application program, or application software) run in the computing device 800, and one or more of data, instructions, and information for the operation of the computing device 800. At least some of the computer programs may be downloaded from an external device (not illustrated). In addition, at least some of the computer programs may be present on the computing device 800 from the time of shipment for basic functions (for example, receiving a message, sending a message) of the computing device 800.

Meanwhile, the memory 820 may load one or more computer programs 851 from the storage 850 to execute the live-commerce method according to the embodiments of the present disclosure. In FIG. 7, a random access memory (RAM) is illustrated as an example of the memory 820.

The bus 830 provides a communication function between the components of the computing device 800. The bus 830 may be implemented as various types of buses such as an address bus, a data bus, and a control bus.

The network interface 840 supports wired/wireless Internet communication of the computing device 800. In addition, the network interface 840 may support various communication methods other than the Internet communication. To this end, the network interface 840 may be configured to include a communication module well known in the technical field of the present disclosure.

The storage 850 may non-transitorily store one or more computer programs 851. The storage 850 may be configured to include a nonvolatile memory, such as a read only memory (ROM), an erasable programmable ROM (EPROM), an electrically erasable programmable ROM (EEPROM), and a flash memory, a hard disk, a removable disk, or any well-known computer-readable recording medium in the technical field to which the present disclosure belongs.

The computing device illustrated in FIG. 7 may not only implement the live-commerce server 100 according to some embodiments of the present disclosure, but may also implement the seller terminal 200 or the user terminal 300 according to some embodiments of the present disclosure. In this case, the computing device 800 may further include an input unit and an output unit in addition to the components illustrated in FIG. 7.

The input unit may include a camera for receiving a video signal, a microphone for receiving an audio signal, and a user input unit for receiving information from a user. The user input unit may include one or more of a touch key and a mechanical key. Video data collected through the camera or the audio signal collected through the microphone may be analyzed and processed by a user's control command.

The output unit is for visually, auditorily or tactilely outputting the command processing result and may include a display unit, an optical output unit, a speaker, a haptic output unit, and an optical output unit.

Meanwhile, components constituting the live-commerce server 100, the seller terminal 200, and the user terminal 300 may be implemented as modules. The module refers to software or hardware components such as a field programmable gate array (FPGA) or an application specific integrated circuit (ASIC), and the module performs certain roles. However, the module is not meant to be limited to software or hardware. The module may be configured to be stored in a storage medium that may be addressed or may be configured to execute one or more processors. Accordingly, for example, the "module" includes components such as software components, object-oriented software components, class components, and task components, processors, functions, attributes, procedures, subroutines, segments of program code, drivers, firmware, microcode, circuit, data, a database, data structures, tables, arrays, and variables. The functions provided by the components and modules may be combined into a smaller number of components and modules or further divided into additional components and modules.

According to the present disclosure, it is possible to increase a user's purchase rate by increasing users' concentration on a live-commerce broadcast and stimulating users' interest in the live-commerce broadcast through a game using a chat function of the live-commerce.

According to the present disclosure, it is possible to allow users to check past game logs through a chat window and monitor a process of selecting winners by linking chatting and games.

According to the present disclosure, it is possible to display chatting and game information on a user terminal without a time difference by including the game information in a chat message and delivering the game information to the user terminal.

According to the present disclosure, it is possible to allow sellers to select product sales methods that fit purposes and users to accept a selection of winners for the limited number of products by enabling a product sales method to be determined differently as one of an auction, a lottery, first-come-first-served basis, and dice according to the number of users, a type of products to be sold, the number of products to be sold, and a method of providing products.

According to the present disclosure, it is possible to provide a live-commerce system and method for selecting winners based on a time of a live-commerce server in the case of a product sales method such as first-come-first-served basis in which a user's game activity time affects a selection of winners, and selecting winners by peer to peer (P2P) regardless of a time of the live-commerce server in the case of a product sales method such as dice in which the user's game activity time does not affect the selection of winners.

The present disclosure has been described with reference to the embodiments and drawings, but is not limited to the above embodiments. It is obvious to those of ordinary skill in the art to which the present disclosure pertains that other modifications based on the technical idea of the present disclosure can be implemented in addition to the embodiments disclosed herein. Therefore, the scope and spirit of the present disclosure should be understood only by the following claims, and all of the equivalences and equivalent modifications to the claims are intended to fall within the scope and spirit of the present disclosure.

What is claimed is:

1. A live-commerce system comprising:
a seller terminal equipped with a live-commerce application that allows a seller to produce a live-commerce video and progress a sale of a product;
a first user terminal equipped with the live-commerce application that has a function of receiving and playing the live-commerce video in a form of streaming data and allowing a first user to purchase the product; and
a second user terminal located in a vicinity of the first user terminal and equipped with the live-commerce application that has a function of receiving and playing the live-commerce video in a form of streaming data and allowing a second user to purchase the product; and
a live-commerce server configured to utilize a chat function between the seller terminal and the second user terminal to progress a game included in a plurality of games and selected as a method of selling the product by the seller,
wherein the live-commerce video includes video data and audio data, and an access address for accessing the live-commerce server is inserted into the audio data, and a product code of the product is inserted into the video data,
wherein the second user terminal is configured to:
scan the audio data outputted from the first user terminal to obtain the access address for accessing the live-commerce server,
access the live-commerce server based on the obtained access address,
scan a screen displayed on the second user terminal when the live-commerce server is accessed based on the obtained access address,
extract the product code of the product from the scanned screen, and
obtain product purchase information of the product corresponding to the extracted product code,
wherein the live-commerce server delivers a chat message including game information related to the selected game to the second user terminal based on a time of the live-commerce server to control chatting and the game information to be displayed on the second user terminal in real-time through the chat function,
wherein the live-commerce server generates a game list including the plurality of games, sorts the plurality of games according to a priority of each of the plurality of games and provides the game list to the seller terminal, each of the plurality of games being selectable as a product sales method,
wherein the live-commerce server determines the priority of each of the plurality of games based on at least one of a type of the product to be sold by the seller, a method of providing the product, and the number of users watching the live-commerce video, and
wherein the seller terminal adjusts an intervention rate of the live-commerce server according to a type of the game selected from the plurality of games.

2. The live-commerce system of claim 1, wherein the live-commerce server includes:
a game method determination unit configured to determine the game list and provides the determined game list to the seller terminal;
a chat link processing unit configured to display game information of the game selected from the game list by the seller on the seller terminal and the second user terminal, the game information including one or more of start, progress, end, and winner information of the game selected by the seller; and
a winner determination unit configured to progress the game selected by the seller and determine the winner.

3. The live-commerce system of claim 2, wherein the game method determination unit provides the seller terminal with the game list including all games that are executable in the live-commerce application.

4. The live-commerce system of claim 2, wherein the seller terminal progresses the game after the seller terminal is directly connected to the second user terminal in a peer to peer (P2P) method without going through the live-commerce server when the game is progressed in which a user's game activity time does not affect a selection of winners, and
progresses the game after the seller terminal is connected to the second user terminal by increasing the intervention rate of the live-commerce server when the game is progressed in which the user's game activity time affects the selection of the winners.

5. The live-commerce system of claim 4, wherein the seller terminal adjusts the intervention rate of the live-commerce server differently according to the number of users watching the live-commerce video, and
increases the intervention rate of the live-commerce server as the number of users increases.

6. The live-commerce system of claim 2, wherein the chat link processing unit determines that the seller and the second user participate in the game selected by inputting game activity according to a predefined rule to a chat window.

7. The live-commerce system of claim 1, wherein the plurality of games include one or more of an auction, a lottery, first-come-first-served basis, and dice.

8. A live-commerce method of determining a winner, who purchases a product sold by a seller or receives the product free of charge, among users watching a live-commerce video through a game linked with a chat function in a live-commerce system, the live-commerce method comprising:

receiving, by a live-commerce server, the live-commerce video from a seller terminal and transmitting a real-time broadcast to a first user terminal, wherein the live-commerce system includes the live-commerce server, the first user terminal, and a second user terminal located in a vicinity of the first user terminal, and the live-commerce video includes video data and audio data, and an access address for accessing the live-commerce server is inserted into the audio data, and a product code of the product is inserted into the video data;

performing, by the second user terminal, the following operations:
  scanning the audio data outputted from the first user terminal to obtain the access address for accessing the live-commerce server,
  accessing the live-commerce server based on the obtained access address,
  scanning a screen displayed on the second user terminal when the live-commerce server is accessed based on the obtained access address,
  extracting the product code of the product from the scanned screen, and
  obtaining product purchase information of the product corresponding to the extracted product code;

generating, by the live-commerce server, a game list including a plurality of games, sorting, by the live-commerce server, the plurality of games according to a priority of each of the plurality of games, and providing, by the live-commerce server, the game list to the seller terminal, each of the plurality of games being selectable as a product sales method, wherein the generating of the game list comprises determining the priority of each of the plurality of games based on at least one of a type of the product to be sold by the seller, a method of providing the product, and the number of users watching the live-commerce video; and progressing, by the live-commerce server, a game selected from the plurality of games in the game list by utilizing the chat function between the seller terminal and the second user terminal, wherein the progressing of the selected game includes delivering a chat message including game information related to the selected game to the second user terminal based on a time of the live-commerce server to control chatting and the game information to be displayed on the second user terminal in real-time through the chat function, and wherein the method further comprises adjusting, by the seller terminal, an intervention rate of the live-commerce server according to a type of the game selected from the plurality of games.

* * * * *